United States Patent [19]

Billet

[11] 4,326,611
[45] Apr. 27, 1982

[54] DIAPHRAGM CLUTCH COVER ASSEMBLY

[75] Inventor: Rene Billet, Lamorlaye, France

[73] Assignee: Societe Anonyme Francaise du Ferodo, Paris, France

[21] Appl. No.: 149,981

[22] Filed: May 15, 1980

[30] Foreign Application Priority Data

May 18, 1979 [FR] France .................. 79 12666

[51] Int. Cl.³ .............................................. F16D 13/44
[52] U.S. Cl. ................................. 192/89 B; 192/70.27
[58] Field of Search ............................ 192/89 B, 70.27

[56] References Cited

U.S. PATENT DOCUMENTS

| 2,138,169 | 11/1938 | Hunt | 192/70.27 |
| 3,323,624 | 6/1967 | Maurice | 192/89 B |
| 3,811,544 | 5/1974 | Maucher | 192/70.27 X |
| 4,084,674 | 4/1978 | de Gennes | 192/89 B |
| 4,114,742 | 9/1978 | Rawlings | 192/89 B |
| 4,200,176 | 4/1980 | Courbot | 192/89 B |

FOREIGN PATENT DOCUMENTS

| 1255406 | 11/1967 | Fed. Rep. of Germany . |
| 2012436 | 3/1970 | France . |
| 2012443 | 3/1970 | France . |
| 1599075 | 8/1970 | France . |
| 2057642 | 5/1971 | France . |
| 2398220 | 2/1979 | France . |
| 845164 | 6/1969 | Italy . |

Primary Examiner—Rodney M. Bonck
Attorney, Agent, or Firm—Charles E. Brown

[57] ABSTRACT

A diaphragm clutch cover assembly is disclosed comprising a cover having a peripheral flange secured to a flywheel, a diaphragm spring, assembly means rockably mounting the diaphragm spring on the cover between axial spaced fulcra and axially applying a predetermined resilient clamping load, and a pressure plate fixed for rotation with and axial displacement in relation to the cover. The resilient clamping load on the diaphragm spring is selected between the peak value of the release load on the diaphragm spring at the minimum reference value and the greater of the final value of the release load at the minimum reference value and the final value of the release load at the maximum reference distance. In the coarse of service life the diaphragm spring breaks contact with one of its fulcra when it rocks from its engagement position and its disengagement position.

2 Claims, 15 Drawing Figures

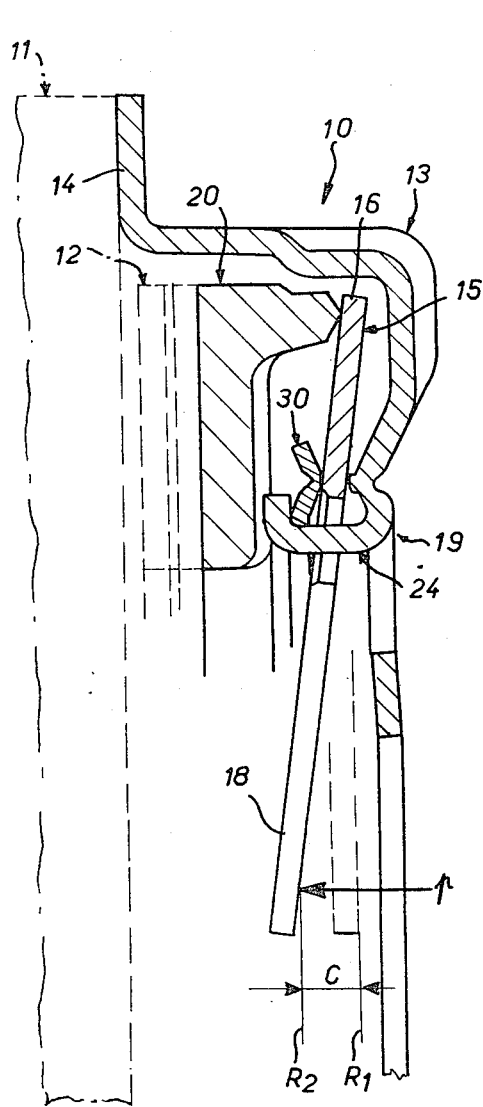
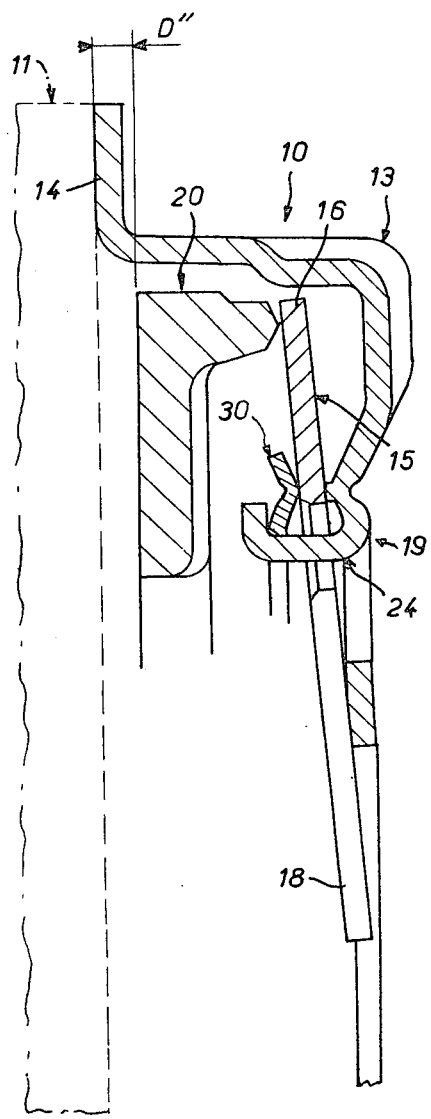

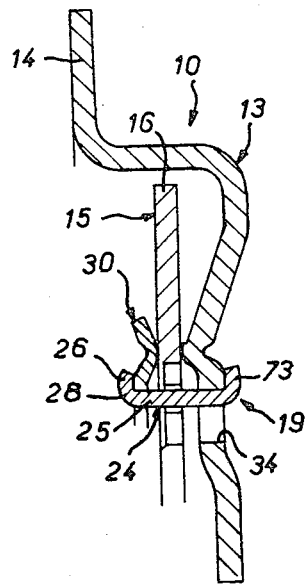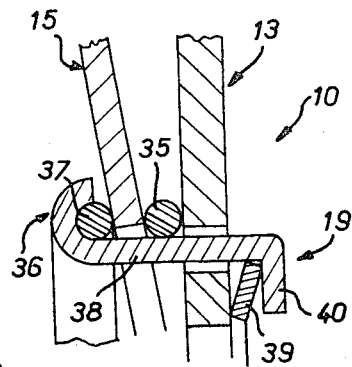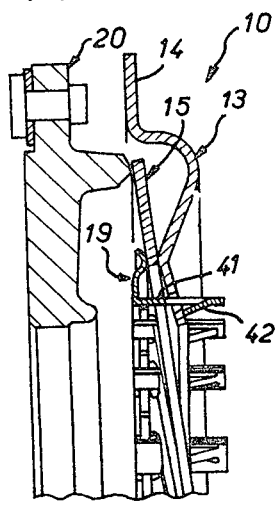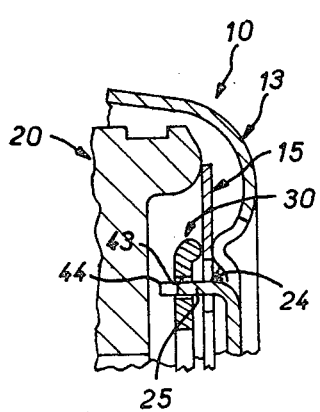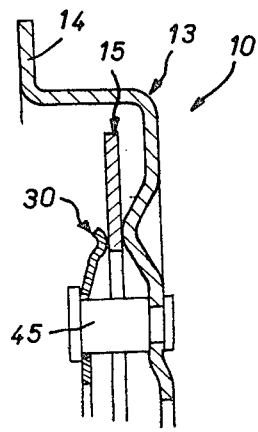

DIAPHRAGM CLUTCH COVER ASSEMBLY

FIELD OF THE INVENTION

The present invention relates generally to diaphragm clutches, especially for motor vehicles, and more particularly the part of such clutches known as the cover assembly, which usually formed as a separate entity, is fixed on a flywheel or reaction plate with a driven disc or clutch plate assembly interposed between the reaction plate and the cover assembly.

BACKGROUND OF THE INVENTION

Typically, such a cover assembly comprises an annular cover having a flange extending radially from its outer periphery for its securement to its associated reaction plate, an annular diaphragm spring having a Belleville washer outer portion and a central portion divided into radial fingers acting as release levers, assembly means for rockably mounting the diaphragm spring on the cover, and a generally annular pressure plate fixed for rotation with and axially displacement with respect to the cover.

In operation the diaphragm spring has a first fulcrum or pivot referred to hereinbelow as the primary fulcrum or pivot, on the cover, or a part fixed thereto which urges the pressure plate toward the reaction plate so that the driven disc, clamped between the reaction plate and the pressure plate is fixed for rotation therewith; the clutch is then in its engaged position.

For disengagement, an axially displaceable part known as a clutch release bearing or throwout bearing must apply to the ends of the radial fingers of the diaphragm spring relatively adjacent to the axis of the cover assembly axis a force, known as the release or disengagement force, adapted to relieve the force the diaphragm spring applies to the pressure plate, thereby freeing the driven disc.

Owing to the structure of the Belleville washer peripheral portion which essentially comprises the resilient means of the diaphragm spring, the diaphragm spring has, as is known, a release load characteristic, measured in line with the ends of the radial fingers which for a given length of travel, hereinbelow referred to as the release travel, of the ends of the radial fingers, in response to the disengagement force applied by the release or throwout bearing, and from a given initial position of the radial fingers, goes through a peak or maximum value before reaching its ultimate or final value at the end of release travel, for the final position of the ends of the radial fingers.

The curve representing the release load as a function of release travel therefore has a characteristic saddleback or hump.

In practice, in the course of the service life of a diaphragm clutch, the peak value and the final release load of the diaphragm spring vary. Indeed, they depend on the overall configuration of the diaphragm spring in the engagement position of the clutch, and therefore depend particularly on the degree of wear of the friction facings of the driven disc, the pressure plate in the engaged position, which engaged position depends on the configuration of the diaphragm spring coming closer to the reaction plate as the friction facings become worn.

It is thus possible to say for the cover assembly taken on its own that the peak value and the final value of the release load on the diaphragm spring also depend on the axial distance, hereinbelow referred to as the reference distance, which at the initial position of the ends of the radial fingers of the diaphragm spring at the start of release travel moves the pressure plate away from the radial edge of the cover remote from the diaphragm spring. This reference distance, in practice, may vary between a maximum reference distance for a new driven disc and a minimum reference distance for a worn driven disc, or even in the absence of the driven disc when the cover assembly is in its stored condition.

One of the major problems posed with diaphragm clutch cover assemblies of the foregoing type relates to the assembly means rockably mounting the diaphragm spring on the cover. Indeed, while, as mentioned above, the diaphragm spring bears against a first fulcrum or pivot referred to as the primary fulcrum, on the cover or a part bearing against it, the assembly means must define a second pivot or fulcrum, referred to as the secondary fulcrum, as the same radius as the primary fulcrum while permitting rocking movement of the Belleville washer peripheral portion of the diaphragm spring when it shifts from its engagement position to its disengagement position of the clutch.

In practice, the assembly means rockably mounting the diaphragm spring on the cover exert a predetermined resilient clamping load between the primary and secondary fulcra.

According to a first option, which is the case with U.S. Pat. No. 3,323,624 (Maurice) issued to the assignees of the present application on June 6, 1967, this clamping load is, by construction, always less than the release load for the diaphragm spring, thereby permitting accentuated progressiveness from the engagement position to the disengagement position of the clutch.

This arrangement, which has given and continues to give satisfaction, at least for certain application, and which is characterized by the separation of the diaphragm spring from the first and second fulcra during disengagement, develops axial play between the diaphragm spring and its fulcra, which is not only detrimental to pressure plate lift from the reaction plate at the end of release travel, and therefore detrimental to correct unclamping of the driven disc, but is also a source of noise and wear.

According to a second option, as disclosed in French Pat. No. 1,599,075 granted on July 15, 1970, the resilient clamping force applied to the diaphragm spring by the assembly means rockably mounting it on the cover, is, by construction, always greater than the clutch disengagement or release load so that such play may not develop.

This arrangement which is therefore characterized by constant contact between the diaphragm spring and its primary fulcrum and thereby contributes to satisfactory lift off of the pressure plate at the end of release travel, has the drawback of interfering with freedom of movement of the diaphragm spring which is necessary for proper smooth rocking from its engagement position to its disengagement position.

Furthermore, by reason of considerable friction due to the resilient clamping involved in this arrangement, an important "hysteresis" effect is inevitably introduced into the assembly, particularly at its actuating end. Finally, the overloading of the diaphragm spring by the fulcra which results, causes increased wear thereof.

SUMMARY OF THE INVENTION

A general object of the present invention is therefore an arrangement producing a particularly advantageous compromise between the two previous alternatives, for at least part of the service life of the clutch.

According to the invention there is provided a diaphragm clutch cover assembly for a motor vehicle, of the type including a generally annular cover having a flange extending radially from its outer periphery for securement of the cover assembly to a reaction plate or flywheel, a generally annular diaphragm spring having a Belleville washer peripheral portion and a central portion divided into radial fingers, assembly means for rockably mounting the diaphragm spring on the cover by applying a predetermined resilient clamping load to the diaphragm spring, a generally annular pressure plate against which the outer periphery of the diaphragm spring bears and which is fixed for rotation with and axial displacement relative to the cover. The diaphragm spring has a release load characteristic measured in line with the ends of its radial fingers which for given release travel of the ends of the radial fingers from an initial position goes through a peak before reaching its final value at the end of the release travel, when the ends of the radial fingers are in their final position, the peak and final values of the release load together depending on the axial reference distance which for the initial position of the radial fingers of the diaphragm separates the face of the radial flange of the cover axially remote from the diaphragm spring from the face of the pressure plate axially remote from the diaphragm spring, and which may vary between a maximum reference distance and a minimum reference distance. The cover assembly is characterized by the resilient clamping load of the diaphragm spring ranging between the peak value of the release load of the diaphragm spring at the minimum reference distance, and the final values of the release load and the greater of the minimum reference distance and the maximum reference distance.

Whereupon, in accordance with the invention, in the course of release travel for going from the engaged position of the clutch to its disengaged position, the primary and secondary fulcra for the diaphragm spring temporarily resiliently move away from each other so that the diaphragm spring has all the freedom of movement necessary for rocking which may occur with ease and produce negligible wear of the Belleville washer peripheral portion of the diaphragm spring, while at the end of the release travel, the fulcra are again close together, clamping the diaphragm spring therebetween, whereby the entire desired pressure plate lift is assured.

In other words, if, according to the invention, the diaphragm spring momentarily loses contact with its primary fulcrum during the release travel, it becomes properly in bearing contact therewith before the end of release travel.

Thus the cover assembly according to the invention benefits from the advantages of a resilient clamping of the diaphragm spring between its fulcra without the drawbacks of hysteresis, high friction and wear, and without the loss of travel of the pressure plate.

BRIEF DESCRIPTION OF THE DRAWINGS

The features and advantages of the invention will be brought out in the description which follows, given by way of example, with reference to the accompanying diagrammatic drawings, in which:

FIGS. 2 and 3 are similar views and illustrate two successive stages of the clutch between its engagement and disengagement positions;

FIG. 4 is also a view similar to FIG. 1, the cover assembly being shown alone in its stored position;

FIGS. 7–15 are fragmentary cross-sectional views similar to FIG. 1, each illustrating application of the invention to different known cover assemblies.

DETAILED DESCRIPTION OF PREFERRED EMBODIMENTS

Figure 1:
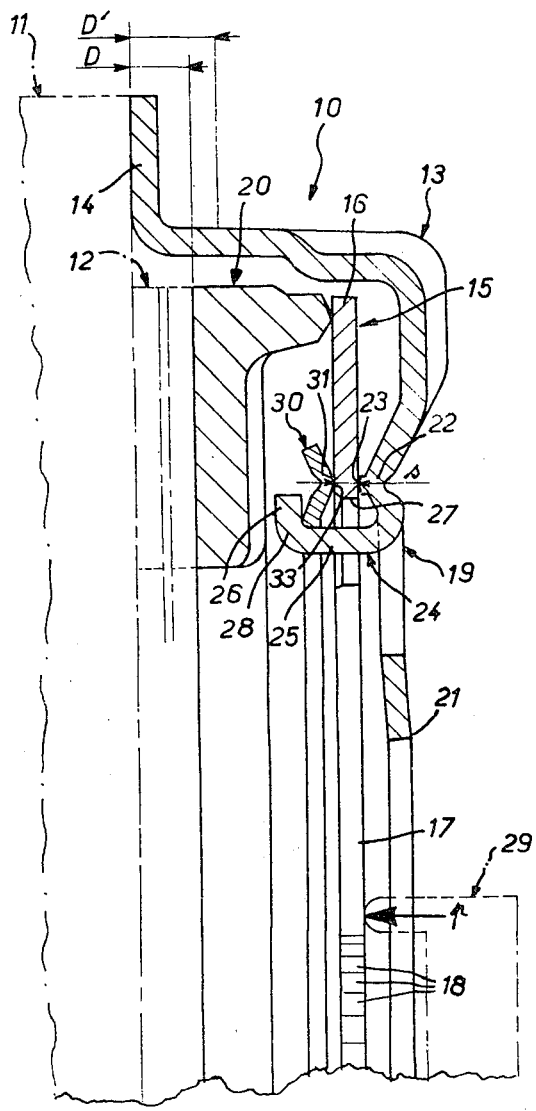
FIG. 1 is a fragmentary longitudinal cross-section of a cover assembly embodying the invention, for the engagement position of the clutch.
Figure 2:
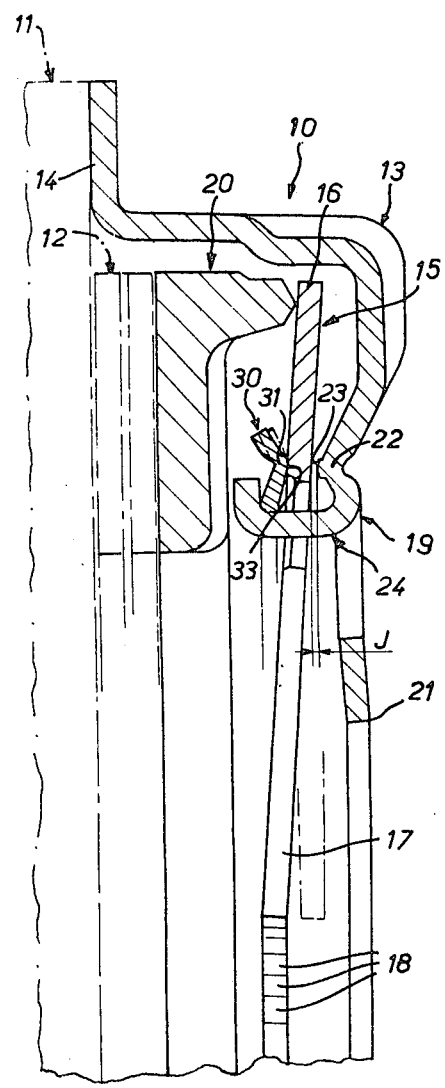

Generally speaking, and in conformity with the drawings, a cover assembly according to the invention usually constitutes an independent unit or entity, designated by general reference numeral 10 throughout the drawings, which is adapted to be mounted on a reaction plate or flywheel 11, shown in chain-dotted lines in FIGS. 1–4, after a driven disc or clutch plate 12, also shown in chain-dotted lines in FIGS. 1–3, is inserted between the cover assembly and the reaction plate 11.

Generally speaking, such a cover assembly 10 usually comprises a first generally annular member or cover 13 having a radially extending flange 14 from its outer periphery for securement to its associated reaction plate 11, by means for screws not shown, a second generally annular member or diaphragm spring 15 having a Belleville washer peripheral portion 16 and a central portion 17 divided into radial fingers 18 defining release levers, assembly means 19 for rockably mounting the diaphragm spring 15 on the cover 13, and a third generally annular member or pressure plate 20 against which the outer periphery 16 of the diaphragm spring 15 bears and which is fixed for rotation with and axial displacement with respect to the cover 13.

These arrangement are well known and disclosed, notably, in U.S. Pat. No. 4,084,674 (De Gennes) issued to the assignee of the present application on Apr. 18, 1978 which is incorporated herein by reference and need not be described in greater detail.

In the embodiment illustrated in FIGS. 1–4, a fulcrum 22 is embossed directly in the cover 13 and defines along the Belleville washer peripheral portion 16 of the diaphragm spring 15 a first annular fulcrum or pivot 23 referred to as the primary fulcrum.

Consequently, in this embodiment, the assembly means 19 comprise a plurality of tabs or lugs 24 which are integrally formed with the cover 13 radially outwardly of the inner periphery thereof. Each lug has an axial portion 25 and a bent-over portion 26 radially outwardly extending from the axial portion 25 toward the periphery of the cover 13. The axial portion 25 of each lug 24 extends through a passageway 27 between adjacent bases of radial fingers 18 of the diaphragm spring.

The radial portion 26 of each lug 24 defines with its axial portion 25 a clamping elbow 28 by which a fulcrum ring 30 which is part of the assembly means 19 is preloaded. Along the median line of the fulcrum ring 30 is directly embossed a fulcrum 31 providing on a second face of the peripheral portion 16 of the diaphragm spring 15 a second annular fulcrum 33 referred to as the secondary falcrum, at the substantially same radius as the primary fulcrum 23 and facing the same.

By construction, the assembly means 19 so arranged apply to the diaphragm spring 15 between the primary and secondary fulcra 23 and 33 a predetermined clamping load.

In the engagement position of the clutch, represented in FIG. 1 which includes the cover assembly 10, the driven disc or clutch plate 12 and the reaction plate of flywheel 11, the diaphragm spring 15 which bears against the cover 13 in line with the primary fulcrum 23 urges the pressure plate 20 toward the reaction plate 11 so that the driven disc 12, clamped between the two plates, is fixed for rotation therewith.

In order to go from its engaged position to its disengaged position represented in FIG. 3, a release load p must be applied to the ends of the radial fingers 18 relatively adjacent the axis of the assembly by an axially displaceable member known as the clutch release bearing or throwout bearing 29, shown in chain-dotted lines in FIG. 1.

In the clutch engaged position the face of the pressure plate 20 turned toward the radial flange 14 of the cover is spaced from the face of the radial flange 14 axially remote from the diaphragm spring 15 by a distance D, called the nominal or reference distance, determined by its bearing against the reaction plate through the driven disc 12.

Such a reference distance D therefore depends on the axial thickness of the driven disc 12, and disregarding other considerations, the amount of wear of the friction facings carried by the driven disc 12. The reference distance therefore varies between a maximum value D', or maximum reference distance, when the driven disc 12 is new, and a minimum value D", or the minimum reference distance, when the friction disc is worn.

For the sake of simplicity, the minimum reference distance D" will be considered the distance between the driven disc 12 and the face of the pressure plate 20 turned toward the flange of the cover 13 when the cover assembly is stored (FIG. 4), the total lack of a driven disc may be likened to maximum wear of the driven disc.

Consequently, whatever the wear of the driven disc 12, the ends of the radial fingers 18 of the diaphragm spring 15 against which the release bearing is applied, must be urged for displacement from the engaged position to the disengaged position, a predetermined axial travel C, referred to as the release travel, from an initial position of the ends of the radial fingers corresponding to the reference distance D concerned.

In other words, in FIG. 3, for the release travel C, the ends of the radial fingers 18 of the diaphragm spring 15, in line with the release load p applied thereto, moves from their initial position $R_1$ schematically shown in dashed lines in FIG. 3, to a final position $R_2$, represented in solid lines in the same figure.

Figure 5:
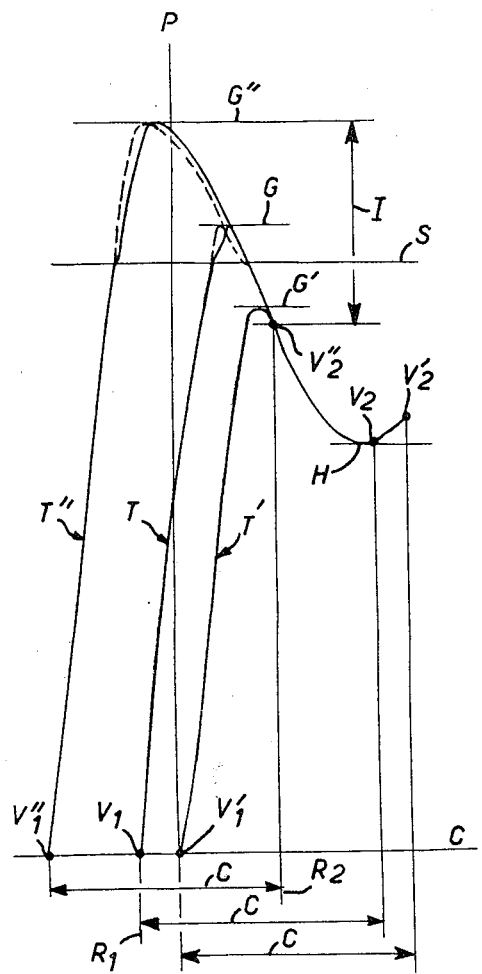
FIG. 5 is a graph illustrating the invention for a first embodiment thereof.

In practice, and as is known and represented in the graph of FIG. 5, where the release travel C is marked along the obscissae and the release load P on the ordinate axis, the release load being the resultant along the axis of the the entire aforesaid release load, the illustrated representative curve of the release load P has a characteristic saddle back or hump, i.e., from an initial value $V_1$ corresponding to the initial position of the ends of the radial fingers 18 of the diaphragm spring 15, assumed to be zero, it goes through a peak value G, then in some cases mentioned above, through a minimum value H, before reaching its final value $V_2$ at the end of the release travel C for the corresponding final position $R_2$ of the ends of the radial fingers 18 of the diaphragm spring.

But, in practice, the peak value G and the final value $V_2$ of the release load P both depend upon the reference distance D.

As the reference distance decreases the value of the peak G increases and thus passes through a minimum peak value G' for a maximum reference distance D', to a maximum peak value G' for a minimum reference distance D" which is assumed, as proposed above, to correspond to the absence of any driven disc, likened to the maximum wear thereof.

Thus, at any time in the service life of the clutch concerned, the representative curve of the release load P for the diaphragm spring is between two limit curves, one, T', when the driven disc is new and the other, T", when the driven disc is totally worn, or absent. Curves T,T' and T" normally have a common portion, following their respective peak values G,G',G".

The final values $V_2$, $V'_2$, $V''_2$ corresponding to the release load are along the common section at a distance along the abscissae from the initial load $V_1$, $V'_1$, $V''_1$ equal to the release travel C.

With the embodiment illustrated in the graph of FIG. 5, the final value $V'_2$ of the release load for a new driven disc, i.e., a maximum reference distance, is located along the abscissae beyond the minimum trough H, while the final value $V''_2$ of the release load for a worn or absent driven disc, i.e., for a minimum reference distance, is along the abscissae less than the minimum trough value and is greater than the final value $V'_2$ of the release load.

According to the invention, the resilient clamping load S applied to the diaphragm spring 15 by the assembly means 19 rockably mounting it on the cover and defined as being the resultant along the axis of the assembly of the resilient clamping load s mentioned above, is, by construction, between a peak value G" of the release load for a diaphragm spring 15 at a minimum reference distance D", and the greater of the final values $V'_2$ and $V''_2$ of the release load at a maximum reference distance D' and a minimum reference distance D" which in the graph of FIG. 5 the final value $V''_2$ corresponding to the minimum reference distance D"; in this graph is in addition the range I in which the resilient clamping load S according to the invention lies.

If the peak value of the representative curve of the release load is less than the resilient clamping load S, as is the case with the graph of FIG. 5, for the beginning of the service life of the clutch, the diaphragm spring 15 permanently remains in contact with its primary and secondary fulcra 23 and 33 as the clutch moves from its engagement position to its disengagement position, and likewise during its return movement to its engagement position.

On the other hand, for reasons which will become clear hereinbelow, in practice it will be provided that from the start of the service life of the clutch, if, as represented by curve T in FIG. 5, the peak value of the representative curve of the release load P is greater than the resilient clamping load S, there reaches a time during the change of the clutch from its engagement position to its disengagement position where the release load P of the diaphragm spring becomes greater than the resilient clamping load S, the assembly means 19 developing this load yielding elastically whereby the primary and secondary fulcra 23 and 33 of the diaphragm spring 15 move away from each other and therefore, as illustrated in FIG. 2, the diaphragm spring 15 loses contact with the cover 13, and a gap J develops between the diaphragm spring 15 and the primary fulcrum 23 provided on the cover 13.

The diaphragm spring 15 is then only in contact with its secondary fulcrum 33 so that the representative curve of its release load has, as schematically shown in solid line in the graph of FIG. 5, a characteristic shift or inflection with respect to what it would have been if the diaphragm spring 15 continued to bear against the cover 13 as schematically represented by the dashed line on this graph.

Contemporaneously, as the resilient deformation is imparted thereto, the stiffness of the diaphragm spring increases so that it reaches an equilibrium configuration quickly. This situation continues until it passes through the peak value which corresponds to the swinging or rocking of the diaphragm spring 15, the release load P thereof becoming once again less than the resilient clamping load S.

The assembly means 19 are always able to overcome once again the release load and therefore they bring the diaphragm spring 15 back into contact with the cover 13, the diaphragm spring 15 once again being clamped between its primary and secondary fulcra 23 and 33.

But, according to the invention, the rocking of the diaphragm spring necessary for its operation advantageously occurs when the diaphragm spring is not clamped and therefore in the best possible conditions and without wear.

At the end of the release travel the diaphragm spring is properly in contact with the cover 13 so that the pressure plate lift 20 is optimal.

Figure 6:
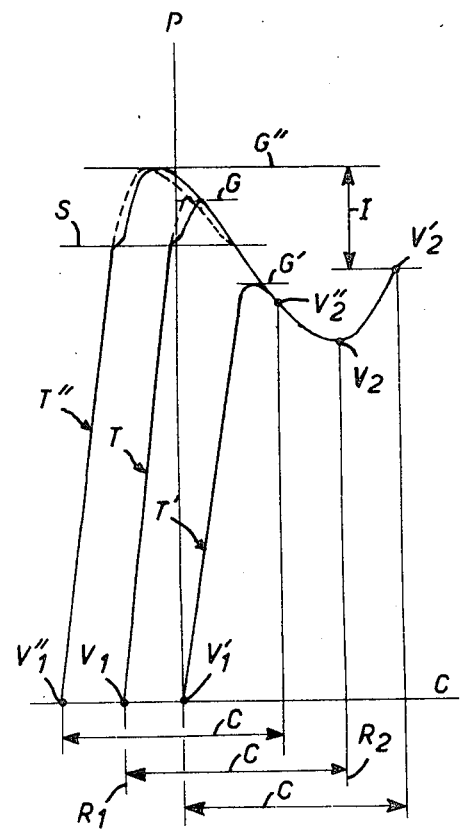
FIG. 6 is a graph similar to that of FIG. 5 for a second embodiment of the invention.

The graph of FIG. 6 illustrates an embodiment in which the final value $V'_2$ of the release load corresponding to a maximum reference distance $D'$ is greater than the final value $V''_2$ of the release load for the minimum reference distance $D''$.

As above, according to the invention, the resilient clamping load S, is by construction between the peak value $G''$ of the release load at the minimum reference distance $D''$ and the final value $V'_2$ of the release load at the maximum reference distance $D'$ as schematically shown by the range I in the graph of FIG. 6.

In practice, the construction of the assembly means 19 is immaterial.

For example, in FIG. 7, which corresponds to FIG. 11 of the above mentioned De Gennes U.S. Pat. No. 4,084,674 the lugs 24 which the assembly means define may be independent of the cover 13; in this case, other than the axial portion 25 and their radial portions 26 they each comprise at the other end of the axial portion 25 a radial portion 73 which bears against the face of the cover 13 remote from the diaphragm spring 15 after the adjoining axial portion 13 extends through passageway provided for that purpose.

In the alternative embodiment of FIG. 8, the assembly means 19 comprise a toroidal fulcrum ring 35 which is interposed between the diaphragm spring 15 and the cover 13 and which defines for the diaphragm spring 15 its primary fulcrum, and an annular member 36 which on the side of the diaphragm spring 15 remote from the cover 13 has a curl for maintaining another toroidal fulcrum ring 37 defining the secondary fulcrum 38 in contact with the diaphragm spring 15. The annular member 36 extends through the diaphragm spring 15 and the cover 13 where it comes to bear against the face of the cover remote from the diaphragm spring 15 through a Belleville washer 39, the axial tabs 38 each having a right-angle bend 40 maintaining the Belleville washer 39 in place.

In another alternative embodiment illustrated in FIG. 9, the assembly means 19 are formed in one piece with an annular member which defines the secondary fulcra for the diaphragm spring 15 and which has axial tabs 41 extending through the diaphragm spring 15 and the cover 13; they are directly snapped in place on the cover 13, the axial tabs 41 each having a resiliently deformable latching tongue 42.

Figure 15:
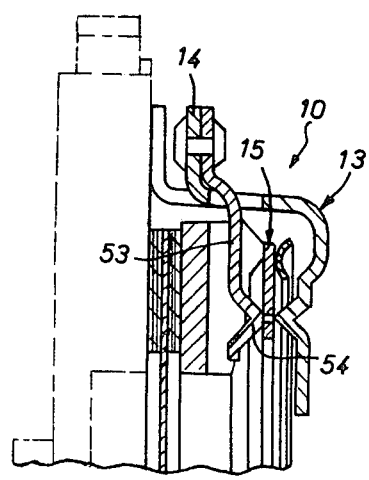

According to yet another alternative embodiment illustrated in FIG. 10, corresponding to FIG. 15, of U.S. Pat. No. 2,138,169 the assembly means 19 comprise lugs 24 integrally formed with the cover 13 but their axial portions are of reduced size and extend through the fulcrum ring 30 via passageways 43 provided for that purpose. The deformed ends 44 of the axial portions 44 wedge the fulcrum ring 30 in place. In this embodiment the fulcrum ring 30 is generally flat but has an annular bead at its outer periphery for contact with the diaphragm spring 15 which pivots about the fulcrum ring 30 to apply pressure against the pressure plate 20.

The embodiment of FIG. 11 is rather similar to that of FIG. 10 the difference being the assembly means 19 comprise pins or rivets 45 riveted to the cover 13 for securing the diaphragm spring 15 in position.

Figure 12:
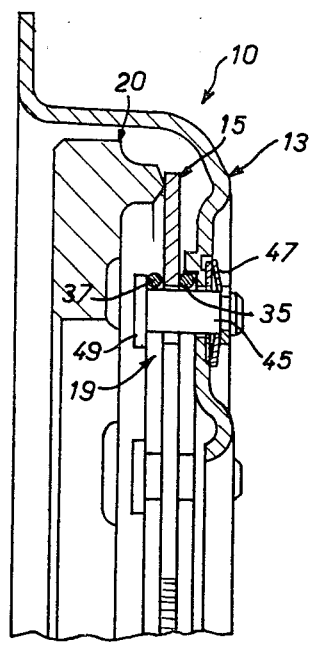

In the embodiment illustrated in FIG. 12, the assembly means 19 also include pins or rivets 45 but these are not riveted to the cover 13. Each of the pins 45 is in simple bearing contact against the cover 13 through a Belleville washer 47. In addition in this embodiment the assembly means 19 comprise two toroidal fulcrum rings 35, 37 disposed on opposite sides of the diaphragm spring 15, the first fulcrum ring 35 between the diaphragm spring and the cover 13, and the second fulcrum ring 37 between the diaphragm spring 15 and the heads 49 on the pins 45.

Figure 13:
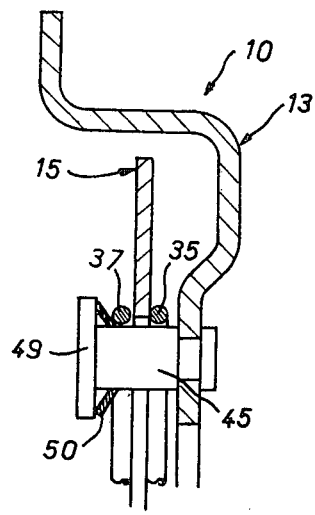

In the embodiment of FIG. 13, the pins 45 are riveted to the cover 13 and the toroidal fulcrum ring 37 is interposed between the a Belleville washer 50 and the diaphragm spring.

Figure 14:
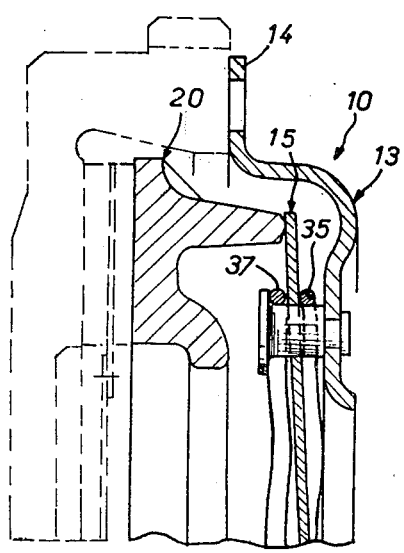

In the emdobiment illustrated in FIG. 14, corresponding to FIG. 1, of German AS No. 1,255,406, such a Belleville washer is not provided but each of the fulcrum rings of circular cross section 35 and 37 is wavy or corrugated to define a certain amount of axial resilience.

In this embodiment the cover assembly is mounted on a pot-shaped flywheel and not a flat flywheel as in all the other illustrated embodiments. Accordingly as the driven disc is worn the distance between the face of the radial flange of the cover which bears against the flywheel and the face of the pressure plate cooperable with the driven disc increases. The maximum reference distance in this embodiment is here again taken to be the distance between the face of the radial flange of the cover turned towards the flywheel when the driven disc is new, and other reference distances are taken to be the maximum reference distance minus the actual wear. Thus the minimum reference distance is taken to be the maximum reference distance minus the axial displacement of the pressure plate when the cover assembly is in its stored position. In effect in this arrangement and the embodiments of the other figures the wear is again substracted so as to preserve the meaning of the minimum reference distance and not added which would make the minimum reference distance greater than the maximum reference distance.

Finally in the embodiment of FIG. 15, corresponding to FIG. 2 of Italian Pat. No. 845,164, the assembly means 19 are simply formed as lugs 53 radially mounted at the radial flange 14 of the cover 13 and having an embossed fulcrum 54 for contact with the diaphragm spring 15 in line with the embossed fulcrum ring 22 in the cover 13.

These various alternative embodiments are well known per se and therefore need not be described in greater detail. They are mentioned here only to illustrate the diversity of embodiments to which the present invention may be applied.

Of course the present invention is not considered to be limited to these various embodiments.

What is claimed is:

1. A diaphragm clutch cover assembly for a motor vehicle, including a generally annular cover having a flange radially extending from its outer periphery for securing said cover to a reaction plate or flywheel, a generally annular diaphragm spring having a Belleville washer peripheral portion and a central portion divided into radial fingers, assembly means for rockably mounting said diaphragm spring on said cover and axially applying a predetermined resilient clamping load, and a generally annular pressure plate against which said diaphragm spring peripheral portion bears, said pressure plate being fixed for rotation with and axial displacement relative to said cover, said diaphragm spring having a release load characteristic measured in line with the ends of said radial diaphragm fingers which for a given axial release travel from an initial position of the ends of said radial fingers passes through a peak value before reaching its final value at the end of the release travel when the ends of the radial fingers are in their final position, the peak values and the final values of the release load together depending on the axial distance which in the initial position of the ends of said radial fingers separates the face of the radial flange of said cover axially remote from the face of said pressure plate axially remote from said diaphragm spring and ranges between minimum and maximum reference distances, characterized in that the resilient clamping load on said diaphragm spring is between the peak value of the release load on said diaphragm spring at the minimum reference distance and the greater of the final value of the release load at the minimum reference distance and the maximum reference distance.

2. A diaphragm clutch cover assembly for a motor vehicle, including a generally annular cover having a flange radially extending from its outer periphery for securing said cover to a reaction plate or flywheel, a generally annular diaphragm spring having a Belleville washer peripheral portion and a central portion divided into radial fingers, assembly means for rockably mounting said diaphragm spring on said cover between axially spaced fulcra and for axially applying a predetermined resilient clamping load, and a generally annular pressure plate against which said diaphragm spring peripheral portion bears, said pressure plate being fixed for rotation with and axial displacement in relation to said cover, the resilient clamping load on said diaphragm spring being selected between the peak value of a release load on said diaphragm spring at a minimum reference distance and the greater of a final value of the release load at the minimum reference distance and the final value of the release load at a maximum reference distance.

* * * * *